US012321876B2

(12) United States Patent
Singh et al.

(10) Patent No.: US 12,321,876 B2
(45) Date of Patent: Jun. 3, 2025

(54) ARTIFICIAL INTELLIGENCE / MACHINE LEARNING MODEL DRIFT DETECTION AND CORRECTION FOR ROBOTIC PROCESS AUTOMATION

(71) Applicant: UiPath, Inc., New York, NY (US)

(72) Inventors: Prabhdeep Singh, Bellevue, WA (US); Anton McGonnell, Seattle, WA (US); Marco Alban Hidalgo, Redmond, WA (US)

(73) Assignee: UiPath, Inc., New York, NY (US)

( * ) Notice: Subject to any disclaimer, the term of this patent is extended or adjusted under 35 U.S.C. 154(b) by 1124 days.

(21) Appl. No.: 16/934,369

(22) Filed: Jul. 21, 2020

(65) Prior Publication Data

US 2022/0024032 A1    Jan. 27, 2022

(51) Int. Cl.
*G06Q 10/0633* (2023.01)
*B25J 9/16* (2006.01)
*G05B 13/02* (2006.01)
*G06F 17/18* (2006.01)
(Continued)

(52) U.S. Cl.
CPC .......... *G06Q 10/0633* (2013.01); *B25J 9/163* (2013.01); *B25J 9/1653* (2013.01); *B25J 9/1679* (2013.01); *G05B 13/026* (2013.01); *G05B 13/0265* (2013.01); *G06F 17/18* (2013.01); *G06F 18/217* (2023.01); *G06N 20/00* (2019.01)

(58) Field of Classification Search
CPC ..................................................... G06N 20/00
See application file for complete search history.

(56) References Cited

U.S. PATENT DOCUMENTS

| 5,598,076 A | 1/1997 | Neubauer et al. |
| 7,181,314 B2 | 2/2007 | Zhang et al. |
| 7,974,737 B2 | 7/2011 | Tilove et al. |
(Continued)

FOREIGN PATENT DOCUMENTS

| CN | 110378487 A | 10/2019 |
| JP | H05297188 A | 11/1993 |
(Continued)

OTHER PUBLICATIONS

P. Martins, F. Sá, F. Morgado and C. Cunha, "Using machine learning for cognitive Robotic Process Automation (RPA)," 2020 15th Iberian Conference on Information Systems and Technologies (CISTI), Seville, Spain, 2020, pp. 1-6, doi: 10.23919/CISTI49556.2020.9140440. (Year: 2020).*

(Continued)

*Primary Examiner* — James D. Rutten
(74) *Attorney, Agent, or Firm* — LeonardPatel PC; Michael A. Leonard, II; Sheetal S. Patel

(57) ABSTRACT

Artificial intelligence (AI)/machine learning (ML) model drift detection and correction for robotic process automation (RPA) is disclosed. Information is analyzed pertaining to input data for an AI/ML model to determine whether data drift has occurred, analyze information pertaining to results from execution of the AI/ML model to determine whether model drift has occurred, or both. When, based on the analysis of the information, a change condition is found, a change threshold is met or exceeded, or both, the AI/ML model is retrained. The retrained AI/ML model may then be deployed to provide better predictions on real world data.

28 Claims, 8 Drawing Sheets

(51) Int. Cl.
   *G06F 18/21* (2023.01)
   *G06N 20/00* (2019.01)

(56) References Cited

U.S. PATENT DOCUMENTS

| | | | |
|---|---|---|---|
| 8,407,661 | B2 | 3/2013 | Wang et al. |
| 10,360,214 | B2 | 7/2019 | Gold et al. |
| 10,462,172 | B1 | 10/2019 | Sadaghiani et al. |
| 10,599,957 | B2 | 3/2020 | Walters et al. |
| 10,802,889 | B1 | 10/2020 | Ganesan et al. |
| 11,209,813 | B2 | 12/2021 | Cella et al. |
| 11,243,803 | B2 | 2/2022 | Anand et al. |
| 11,256,242 | B2 | 2/2022 | Cella et al. |
| 11,330,087 | B2 | 5/2022 | Wouhaybi et al. |
| 11,468,350 | B2 | 10/2022 | Dalli et al. |
| 11,681,517 | B2 | 6/2023 | Jain et al. |
| 11,693,632 | B2 | 7/2023 | Latapie et al. |
| 2007/0118238 | A1 | 5/2007 | Lefebvre et al. |
| 2011/0178965 | A1 | 7/2011 | Pucher |
| 2016/0279790 | A1 | 9/2016 | Meier et al. |
| 2017/0206469 | A1* | 7/2017 | Das ............ G05B 13/048 |
| 2017/0220407 | A1 | 8/2017 | Estrada et al. |
| 2017/0330109 | A1 | 11/2017 | Maughan et al. |
| 2017/0371886 | A1* | 12/2017 | Chen ............ G06F 17/18 |
| 2017/0372232 | A1 | 12/2017 | Maughan et al. |
| 2018/0012143 | A1 | 1/2018 | Hansen et al. |
| 2018/0165604 | A1 | 6/2018 | Minkin et al. |
| 2018/0197123 | A1 | 7/2018 | Parimelazhagan et al. |
| 2018/0241881 | A1 | 8/2018 | Li et al. |
| 2018/0304471 | A1 | 10/2018 | Tokuchi |
| 2018/0308022 | A1 | 10/2018 | Philips et al. |
| 2018/0341688 | A1 | 11/2018 | Ganesh et al. |
| 2019/0066013 | A1 | 2/2019 | Gupta et al. |
| 2019/0066133 | A1 | 2/2019 | Cotton |
| 2019/0126463 | A1* | 5/2019 | Purushothaman ..... G06Q 10/04 |
| 2019/0147357 | A1 | 5/2019 | Erlandson et al. |
| 2019/0155225 | A1* | 5/2019 | Kothandaraman .. G05B 13/041 |
| 2019/0180746 | A1 | 6/2019 | Diwan et al. |
| 2019/0325341 | A1 | 10/2019 | Kakhandiki et al. |
| 2019/0332508 | A1 | 10/2019 | Goyal et al. |
| 2020/0012900 | A1* | 1/2020 | Walters ............ G06F 16/35 |
| 2020/0048992 | A1* | 2/2020 | Williard ............ E21B 41/00 |
| 2020/0082296 | A1 | 3/2020 | Fly et al. |
| 2020/0111023 | A1 | 4/2020 | Murugappan et al. |
| 2020/0147791 | A1* | 5/2020 | Safary ............ G06N 20/00 |
| 2020/0202171 | A1* | 6/2020 | Hughes ............ G06F 18/214 |
| 2022/0197306 | A1 | 6/2022 | Cella et al. |

FOREIGN PATENT DOCUMENTS

| | | |
|---|---|---|
| JP | 2001510890 A | 8/2001 |
| JP | 2006239849 A | 9/2006 |
| JP | 2018513490 A | 5/2018 |
| KR | 1020060063561 A | 6/2006 |
| KR | 1020187021817 | 8/2018 |
| WO | 2018213205 A1 | 11/2018 |
| WO | 2019093239 A1 | 5/2019 |

OTHER PUBLICATIONS

International Search Report and Written Opinion of the International Search Authority issued by the Korean Intellectual Property Office (KIPO) on Nov. 27, 2020.
Roboyo Robotic Process Automation Page available at https://www.roboyo.de/en/blog/innovative-robotic-process-automation-technology/ (last accessed Dec. 12, 2019).
Ahmadi, Mahshid, et al. "Machine learning for high-throughput experimental exploration of metal halide perovskites." Joule 5.11 ( 2021): pp. 2797-2822. (Year: 2021).
Chakraborti, Tathagata, et al. "From Robotic Process Automation to Intelligent Process Automation: -Emerging Trends-." 8PM 2020 Blockchain and RPA Forum, Seville, Spain, Sep. 13-18, 2020, Proceedings 18. Springer Intern pp. 1-14 (Year: 2020).
First Examination Report issued in Indian Application No. 202217022310 on Jun. 28, 2023.
Herbert, Luke Thomas, Zaza Nadja Lee Hansen, and Peter Jacobsen. "Automated evolutionary restructuring of workflows to minimise errors via stochastic model checking." Probabilistic Safety Assessment and Management Conference. 2014.pp. 1-12 (Year : 2014).
Pavel Kaarnijoki, "Intelligent Automation—Assessing Artificial Intelligence Capabilities Potential to Complement Robotic Process Automation," Master of Science Thesis, Faculty of Engineering and Natural Sciences, Tampere University of Technology (Jan. 2019).
Satish Rampuria, "Non-Final Office Action", issued Apr. 12, 2023, U.S. Appl. No. 17/828,682.
Yoshiyuki Kobayashi et al., "Using Self-Learning RPA to Automate a Greater Range of Business Tasks," Hitachi Review, vol. 67, No. 6, pp. 676-677 (Oct. 31, 2018).
"Introduction to Robotic Process Automation: A Primer" Institute for Robotic Process Automation (2015) .pp. 1-35 (Year: 2015).
Anagnoste, Sorin. "Setting up a robotic process automation center of excellence." Management Dynamics in the Knowledge Economy 6.2 (2018): pp. 307-332. (Year: 2018).
Casale, Frank. "Here come the robots: The emergence of Robotic Process Automation and the beginning of the end of Outsourcing as we know it." Tulostettu 25 (2014): 2018.pp. 1-4 (Year: 2018).
Chen, Heping, Thomas Fuhlbrigge, and Xiongzi Li. "Automated industrial robot path planning for spray painting process: a review." 2008 IEEE International Conference on Automation Science and Engineering. IEEE, 2008. pp. 552-527 (Year: 2008).
Chin, Roland T., and Charles R. Dyer. "Model-based recognition in robot vision." ACM Computing Surveys (CSUR) 18.1 (1986): pp. 67-108. (Year: 1986).
Parasuraman, Raja, Thomas B. Sheridan, and Christopher D. Wickens. "A model for types and levels of human interaction with automation." IEEE Transactions on systems, man, and cybernetics—Part A: Systems and Humans 30.3 (2000): pp. 286-297. (Year: 2000).
Satish Rampuria, "Non-Final Office Action", issued Feb. 16, 2022, U.S. Appl. No. 16/708,083.
Satish Rampuria, "Notice of Allowance", issued Apr. 14, 2022, U.S. Appl. No. 16/708,083.
International Search Report & Written Opinion, issued Apr. 15, 2021, PCT Application No. PCT/US20/52424.
Satish Rampuria, "Notice of Allowance", issued Sep. 5, 2023, U.S. Appl. No. 17/828,682.
Dudley, John J., and Per Ola Kristensson. "A review of user interface design for interactive machine learning." ACM Transactions on Interactive Intelligent Systems (TiiS) 8.2 (2018): pp. 8:1-8:37. (Year: 2018).
Holzinger, Andreas, et al. "Towards interactive Machine Learning (iML): applying ant colony algorithms to solve the traveling salesman problem with the human-in-the-loop approach." International Cross-Domain Conference, PAM L 2016,pp. 1-16 (Year: 2016).
Wang, Hongbign, et al. "Integrating reinforcement learning with multi-agent techniques for adaptive service composition." ACM Transactions on Autonomous and Adaptive Systems (TAAS) 12.2 (2017): pp. 1-42. (Year: 2017).
"Machine Learning (ML) for Robotic Process Automation (RPA)," IP.com No. IPCOM000259995D available at http://ip.com/IPCOM/IPCOM000259995 (Oct. 7, 2019).
Extended European Search Report issued in European Application No. 20877975.1 on Oct. 12, 2023.
Ardelt, et al., "Highly Automated Driving on Freeways in Real Traffic Using a Probabilistic Framework", IEEE Transactions on Intelligent Transportation Systems, vol. 3, No. 4, Dec. 2012.
Ji, et al., "A Probabilistic Framework for Modeling and Real-Time Monitoring Human Fatigue", IEEE Transactions on Systems, Man, and Cybernetics—Part A: Systems and Humans, vol. 36, No. 5, Sep. 2006.
Satish Rampuria, "Non-Final Office Action", issued Nov. 21, 2024, U.S. Appl. No. 18/497,496.
Tong, et al., "A Unified Probabilistic Framework for Spontaneous Facial Action Modeling and Understanding", IEEE Transactions on Pattern Analysis and Machine Intelligence, vol. 32, No. 2, Feb. 2010.

(56) References Cited

OTHER PUBLICATIONS

Decision to Grant a Patent, issued Oct. 7, 2024, JP Patent Application No. 2023-503130.
Kaarnijoki, Pavel, "Intelligent Automation Assessing Artificial Intelligence Capabilities Potential to Complement Robotic Process Automation", Master of Science Thesis, Jan. 2019, Tampereen University, Tampere, Finland.
Notice of Reasons for Refusal, issued Sep. 9, 2024, JP Patent Application No. 2022-520186.
Office Action, issued Oct. 31, 2024, CN Patent Application No. 202080071908.5.
Notice of Allowance, issued Jan. 20, 2025, JP Patent Application No. 2022-520186.
Chatzis, et al., "Visual Workflow Recognition Using a Variational Bayesian Treatment of Multistream Fused Hidden Markov Models", IEEE Transactions on Circuits and Systems for Video Technology, 22.7 (2012); pp. 1076-1086.
Kotb, et al., "Workflow Nets for Multiagent Cooperation", IEEE Transactions on Automation Science and Engineering, 9.1 (2011); pp. 198-203.
Mulutinovic, et al., "End-to-End Training of Differentiable Pipelines Across Machine Learning Frameworks", 2017, pp. 1-5.
Satish Rampuria, "Notice of Allowance", issued Mar. 14, 2025, U.S. Appl. No. 18/497,496.

* cited by examiner

ARTIFICIAL INTELLIGENCE / MACHINE LEARNING MODEL DRIFT DETECTION AND CORRECTION FOR ROBOTIC PROCESS AUTOMATION

FIELD

The present invention generally relates to robotic process automation (RPA), and more specifically, to artificial intelligence (AI)/machine learning (ML) model drift detection and correction for RPA.

BACKGROUND

Trained AI/ML models may be deployed to provide probabilistic solutions for various tasks, such as image recognition and document processing. However, predictions made by AI/ML models may change, or drift, over time. In the context of RPA, where software robots may be performing tasks utilizing AI/ML models either with or without a user's knowledge, or potentially without any user involved at all, AI/ML model drift may be especially problematic. Accordingly, improved techniques for detecting and/or correcting AI/ML model drift may be beneficial.

SUMMARY

Certain embodiments of the present invention may provide solutions to the problems and needs in the art that have not yet been fully identified, appreciated, or solved by current RPA technologies. For example, some embodiments of the present invention pertain to AI/ML model drift detection and correction for RPA.

In an embodiment, a computer program for performing AI/ML model drift detection and correction for RPA is embodied on a non-transitory computer-readable medium. The computer program is configured to cause at least one processor to analyze information pertaining to input data for an AI/ML model to determine whether data drift has occurred, analyze information pertaining to results from execution of the AI/ML model to determine whether model drift has occurred, or both. When, based on the analysis of the information, a change condition is found, a change threshold is met or exceeded, or both, the computer program is further configured to cause the at least one processor to retrain the AI/ML model.

In another embodiment, a computer-implemented method for performing AI/ML model drift detection and correction for RPA includes analyzing information pertaining to input data for an AI/ML model to determine whether data drift has occurred, analyzing information pertaining to results from execution of the AI/ML model to determine whether model drift has occurred, or both. When, based on the analysis of the information, a change condition is found, a change threshold is met or exceeded, or both, the method includes retraining the AI/ML model, verifying that the retrained AI/ML model meets one or more performance thresholds, and, when the retrained AI/ML model meets the one or more performance thresholds, deploying the retrained AI/ML model.

In yet another embodiment, a computer-implemented method for performing AI/ML model drift detection and correction for RPA includes analyzing information including one or more statistical distributions of predictions made by the AI/ML model. The information pertains to input data for an AI/ML model to determine whether data drift has occurred, results from execution of the AI/ML model to determine whether model drift has occurred, or both. The method also includes mapping the one or more statistical distributions to a respective action taken by a plurality of RPA robots. When, based on the analysis of the information, a change condition is found, a change threshold is met or exceeded, or both, for at least a period of time, the method further includes retraining the AI/ML model. The action is taken in a respective activity of an RPA workflow of the respective RPA robot.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
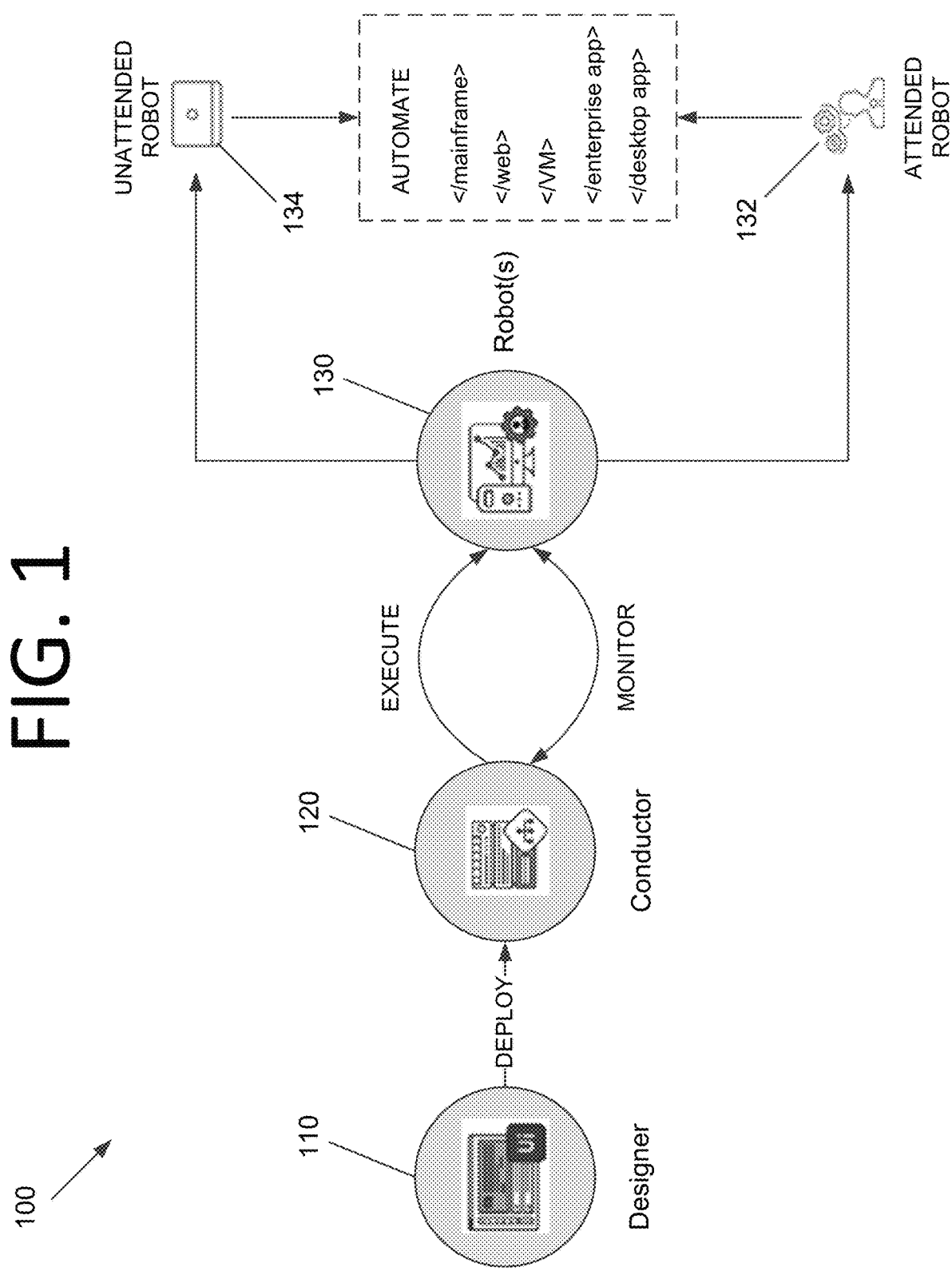
FIG. 1 is an architectural diagram illustrating a robotic process automation (RPA) system, according to an embodiment of the present invention.

Some embodiments pertain to AI/ML model drift detection and correction for RPA. Some embodiments store key performance indicators (KPIs), such as how many predictions an AI/ML model made and how many were actually used, one or more statistical distributions of the predictions, etc. When a change threshold is met or exceeded, an alert or a retraining trigger may be generated. For instance, the change threshold may be deviation from historical performance by at least a certain amount, potentially for at least a certain period of time. The AI/ML model can then be trained, potentially using new(er) data provided by one or more users and/or robots, and a new version of the AI/ML model or an entirely new model may be deployed that provides better predictions and addresses the issues with drift.

AI/ML model drift may occur due to data drift, model drift, or both. Data drift is when the characteristics of the input data for an AI/ML model change over time from the data used to train the AI/ML model. This may cause the predictions made by the AI/ML model to be less accurate. Model drift is a change in the underlying problem in the relationships between data input to and output from the AI/ML model over time. Occurrence of one or both of these forms of drift may cause the AI/ML model performance to suffer, or even render the AI/ML model inaccurate for the problem it was trained to solve. Collectively, data drift and model drift are called "concept drift" herein.

In some embodiments, statistical distributions are mapped to actions the RPA robot(s) are taking in their workflow(s). In certain embodiments, the statistical distributions may be matched to business outcomes. For instance, consider the case where a scale of 1-5 is used for a certain business outcome and the results typically fall within one standard distribution (e.g., 2-4) on the 1-5 scale. If 1 and 5 begin to become more prevalent (e.g., occurring more often than one standard deviation), an exception may automatically be triggered. A human reviewer may view the AI/ML model performance characteristics to determine how the AI/ML model has drifted. Human validation may be performed to improve the model, and thus, the business outcome. The underlying cause of the drift could be either data drift or model drift. A dashboard may be presented in some embodiments that displays these statistical distributions to the user for each business outcome.

In the context of RPA, detecting drift may be particularly important. For instance, when RPA robots are calling AI/ML models to make predictions, there is currently no existing way to check model quality in these scenarios without human supervision. The RPA robots are the consumers of the AI/ML models and they may work autonomously. Users may lack control over what actions the robots are taking based on these AI/ML model predictions, and the autonomy of such RPA robots may lead to undesired or even dangerous outcomes (e.g., in the case of mission critical systems).

Some embodiments employ one or more algorithms to measure data drift and model drift. For instance, a technique for reducing the dimensionality of the dataset (e.g., principal component analysis (PCA)), density estimations (i.e., evaluating the continuous nature of the density in a high dimensional space), a combination thereof, etc. may be used. However, it should be noted that any suitable technique(s) can be used to measure drift without deviating from the scope of the invention.

In certain embodiments, a framework is provided and enforced by an automation platform for how to detect and handle AI/ML model drift. For instance, if an AI/ML model is deployed into production, that model may have a common input schema with other deployed AI/ML models in the automation platform. The degree to which a schema definition is enforced may depend on the AI/ML model itself and the AI/ML model pipeline in some embodiments. The input schema describes what the AI/ML model accepts as an input. In some embodiments, this could be a comma-separated value (CSV) file with predefined columns and particular data types. This may enforce certain field requirements and/or values.

For example, if an email body is passed as an input to the AI/ML model in serialized JavaScript Object Notation (JSON), the email body may be treated as input. However, a CSV file with numeric data may not be accepted because the AI/ML model may not know how to interpret the data. The schema may thus assist in keeping undesired or unpermitted data formats from being fed into the AI/ML model.

As a deployed AI/ML model is run and analysis is performed, a representation of the input data and the AI/ML model predictions can be built over time. For instance, the distance between the unidimensional distributions of an original dataset and a new dataset can be measured for covariate drift. In some embodiments, the analysis includes determining whether a statistical moment changes. In certain embodiments, the statistical moment includes a mean, a variance, a skewness, a kurtosis, a covariance, or a combination thereof. Also, the distances between residual drift can be checked for two models. For instance, if two variations of an AI/ML model (e.g., a new version of the model and a previous version of the model) are trained on different datasets or different portions of a dataset, distances between distributions of the models can be used to try to determine why drift is happening in one model and potentially not the other (or at least less).

Consider again the example above where an AI/ML model predicts a class of five classes that input data falls under in a range of 1-5. The AI/ML model has been deployed for 6 months and 95% of the predictions have been class 2, 3, or 4. However, the AI/ML model then begins making a much larger number of predictions of class 1 and class 5. It can then be determined whether the characteristics (e.g., the distribution) of the input data changed, which caused the changes in the predictions, or whether the changes in AI/ML model predictions occurred without significant changes to the input data.

In some embodiments, activities in an RPA workflow may detect whether drift is occurring (and in some cases, what type). For instance, a collection of activities may be available in an RPA designer application that allow a developer to take into account data or model drift. These activities may be configured based on a certain percentage of drift occurring, exceeding a standard deviation, uncommon predictions becoming significantly more common, etc.

When drift is determined to be occurring, a trigger may be generated. For instance, the trigger may cause predictions made by the AI/ML model and/or the input data to be transmitted and stored for a human reviewer to analyze. An action center queue may allow a human to validate and automatically retrain a new version of the model. The human reviewer may then review what the AI/ML model was predicting based on the input data and determine whether there is an issue with the accuracy of the model. When the retrained AI/ML model meets certain thresholds (e.g., a confidence threshold, some form of random sampling, other heuristics, etc.), it could be automatically deployed alongside the existing AI/ML model, drift of the models can be measured side-by-side to see whether the new version of the AI/ML model is performing better on real data. If the model is below that threshold, human review may be performed to determine why the threshold was not met, and an attempt may be made to train the AI/ML model so it meets or exceeds the threshold.

In some embodiments, when an AI/ML model is trained, a portion of the training data is split out to use for testing later. A collection of metrics may be used to create one high level metric to evaluate the model. One example is an F1 score for document understanding models. This is a derivative of precision and recall, and there is a tradeoff between the two. Cross-validation may be performed to split out another piece of the data, mix it up, and use the mixed up data to test the model. However, if the piece of data that is split out is not representative of real world data, the model may be over-fit to the training data and not function well for real world applications.

In some embodiments, this process may be automated. If the F1 score is over 90% for example, the new version of the AI/ML model may be deployed. This new version may then be checked for drift and/or be validated by a human.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
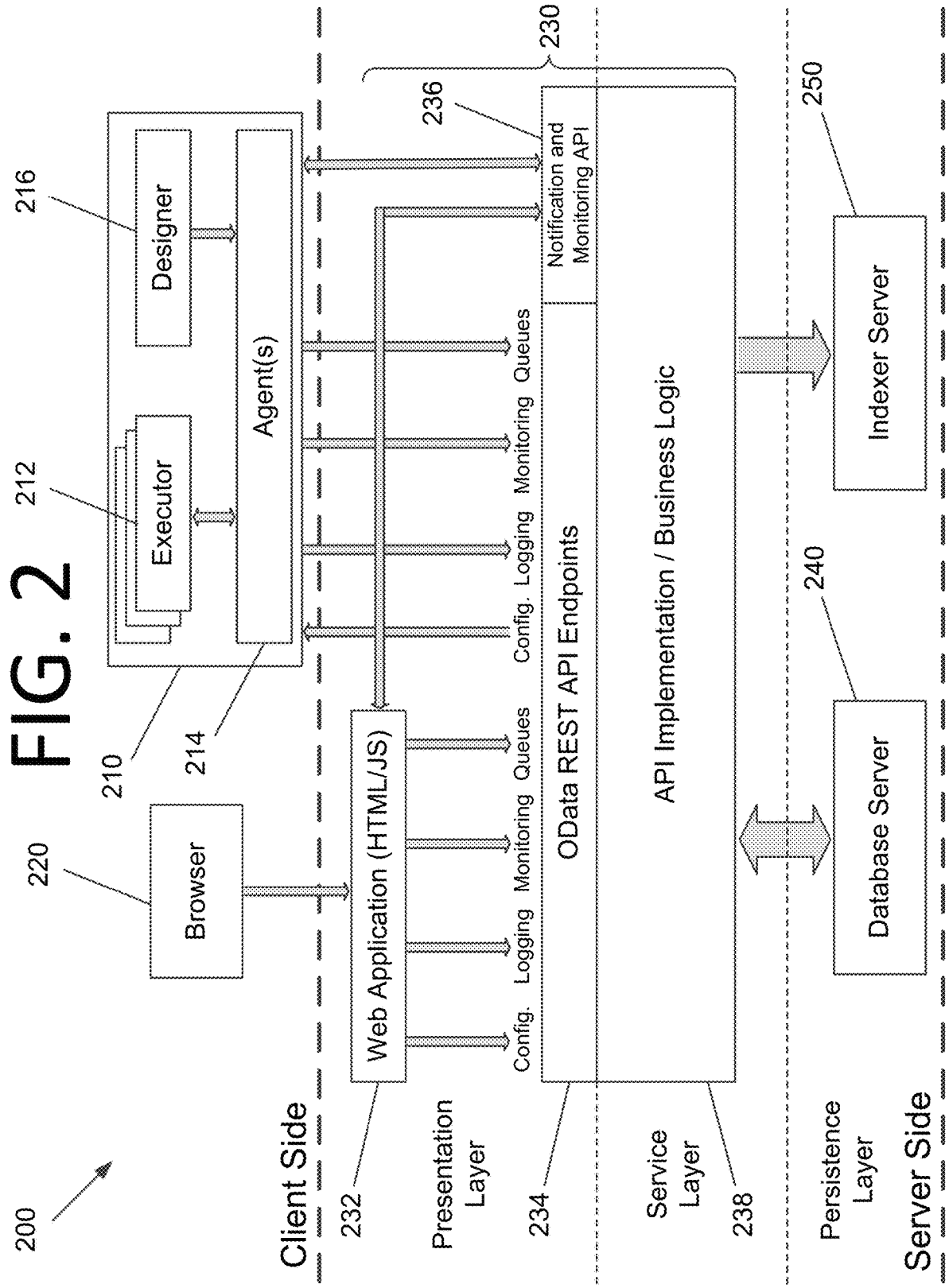
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
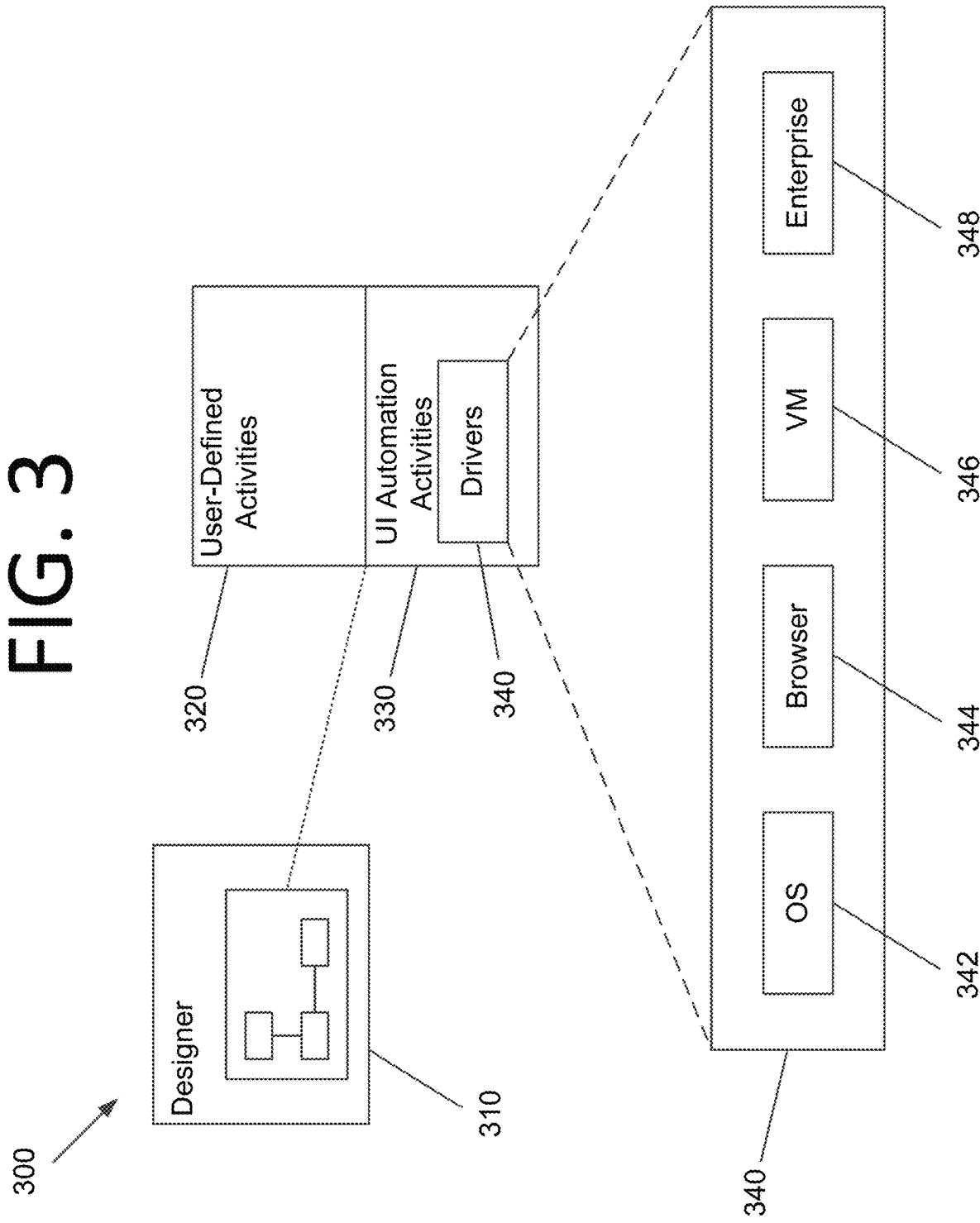
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify nontextual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
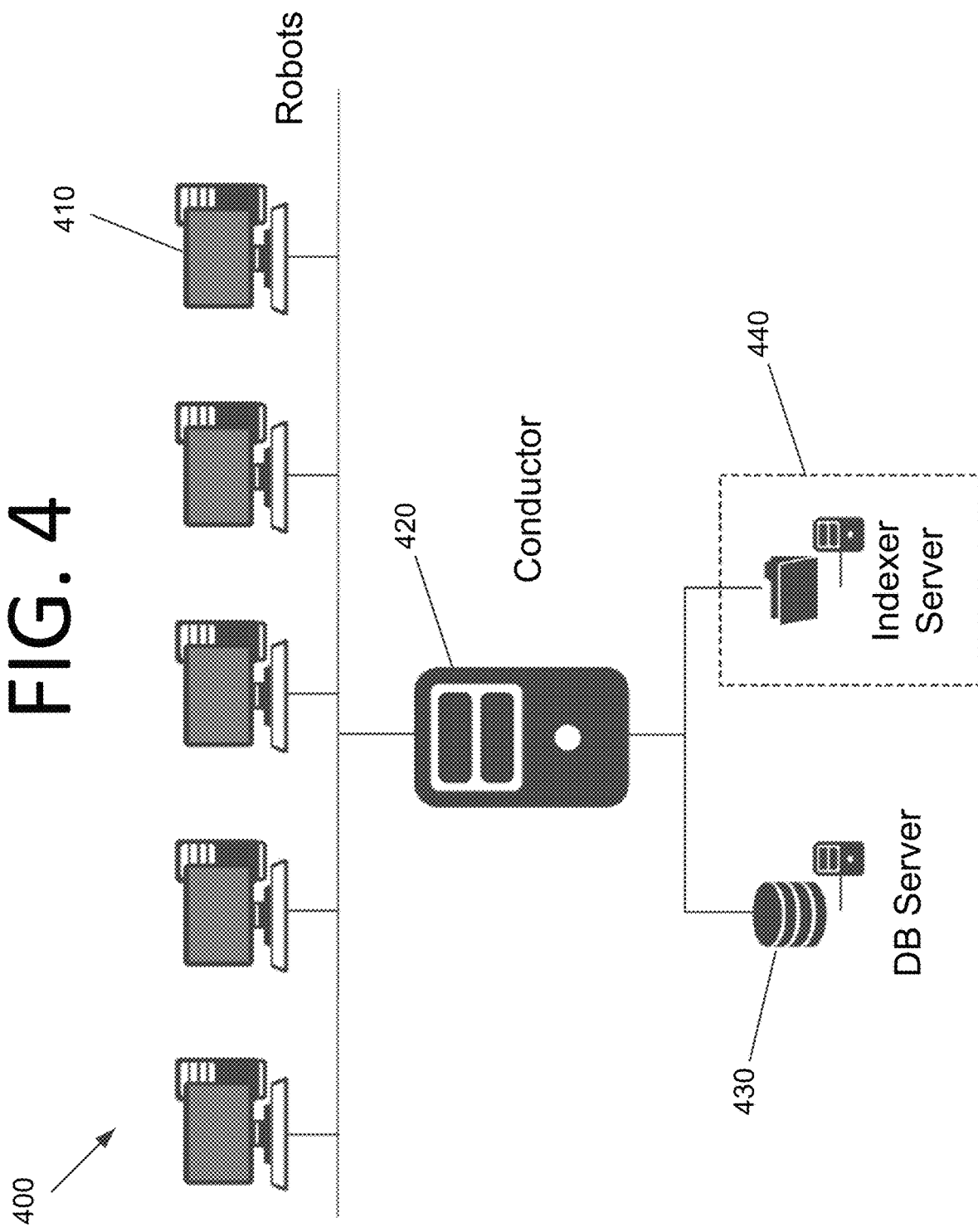
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
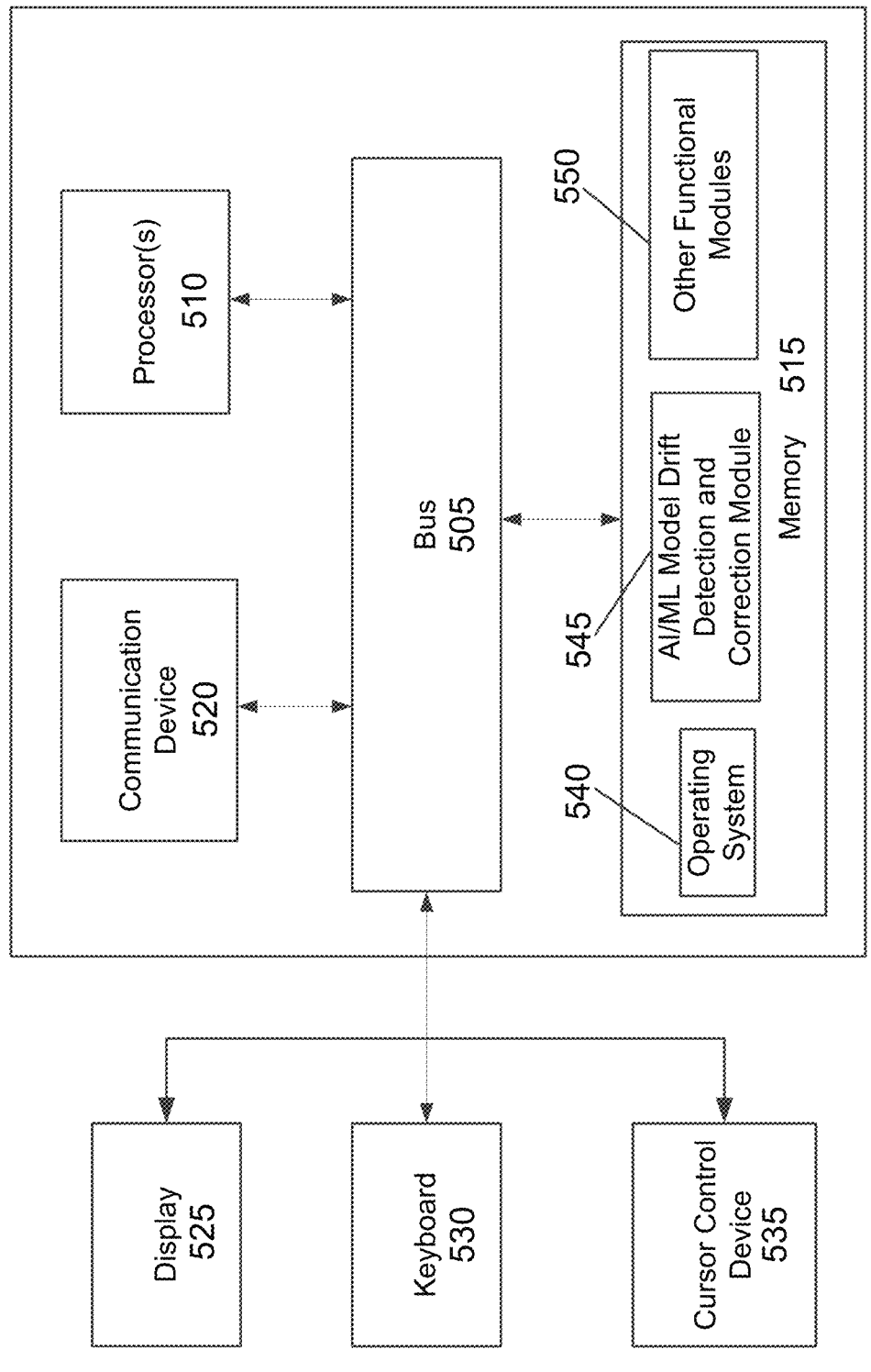
FIG. 5 is an architectural diagram illustrating a computing system configured to perform AI/ML model drift detection and correction for RPA, according to an embodiment of the present invention.

FIG. 5 is an architectural diagram illustrating a computing system 500 configured to perform AI/ML model drift detection and correction for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an AI/ML model drift detection and correction module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In some embodiments, information is obtained with respect to AI/ML model performance. This information may be obtained from a single computing system for local AI/ML models that are custom tailored to that user or computing system, from multiple or many computing systems for AI/ML models that are intended to be applied more generally (e.g., providing solutions at the group level, the company level, the global level, etc.), from the AI/ML model itself, from an application or other process that monitors the AI/ML model, any combination thereof, etc. This information may assist in determining how well an AI/ML model is performing over time. For example, the information may include, but is not limited to, what predictions were made (e.g., the output from the AI/ML model), how many predictions the AI/ML model made and how many were actually used, one or more statistical distributions of the predictions (e.g., a normal distribution, a binomial distribution, or any other statistical distribution), the input data that was provided to the AI/ML model, any combination thereof, etc. In some embodiments, statistical distributions are mapped to actions taken by RPA robots in their workflows (e.g., mapped to activities).

After this information has been collected, the information is analyzed to determine whether data drift, model drift, or both, have occurred. When a change condition is found (e.g., predictions or input data fall outside of a historical range) and/or a change threshold is met or exceeded (e.g., model statistical performance deviates from historical performance by at least a certain amount), an alert or a retraining trigger is generated. In some embodiments, the change condition or change threshold must be met for at least a certain period of time or number of instances before the AI/ML model performance is considered to have drifted. In certain embodiments, the distance between the unidimensional distributions of an original dataset and a new dataset can be measured for covariate drift. Also, the distances between residual drift can be checked for versions of the AI/ML model, if they already exist.

The AI/ML model can then be retrained using the collected information and/or other information to attempt to improve AI/ML model performance. In some embodiments, when the retrained AI/ML model meets certain thresholds, it could be automatically deployed alongside the existing AI/ML model, drift of the models can be measured side-by-side to see whether the new version of the AI/ML model is performing better on real data. In certain embodiments, the new version of the AI/ML model is not deployed unless it meets these thresholds.

In some embodiments, canary testing is used. For instance, the new version of the AI/ML model may be used by a relatively small number of users (e.g., 10% of users at a time by geography or some other filter), who may be unaware of the AI/ML model change. If the new version of the AI/ML model is not performing as well as the previous version, the new version may be rolled back and retraining may be performed.

In certain embodiments, a champion/challenger technique may be used, where input data is sent to both the new version of the AI/ML model and the previous version of the AI/ML model, but only one set of outputs is used. This may be helpful in analyzing how the new version of the AI/ML model and the previous version of the AI/ML model perform based on some ground truth on a like-for-like basis. This technique can assist in determination of which AI/ML model version is right or closer to being right more often. Also, this technique may provide information that helps in troubleshooting as to why the previous version of the AI/ML model was exhibiting certain behaviors.

In some embodiments, a common framework is provided and enforced by an automation platform regarding what information is fed to the AI/ML models called by RPA robots from a workflow activity and/or executed by RPA robots within a workflow activity. This framework may help to ensure that AI/ML models used in an RPA platform consume the intended data. The framework may also help to ensure that the AI/ML model receives input in the appropriate format to enforce certain field requirements and/or values.

Figure 6:
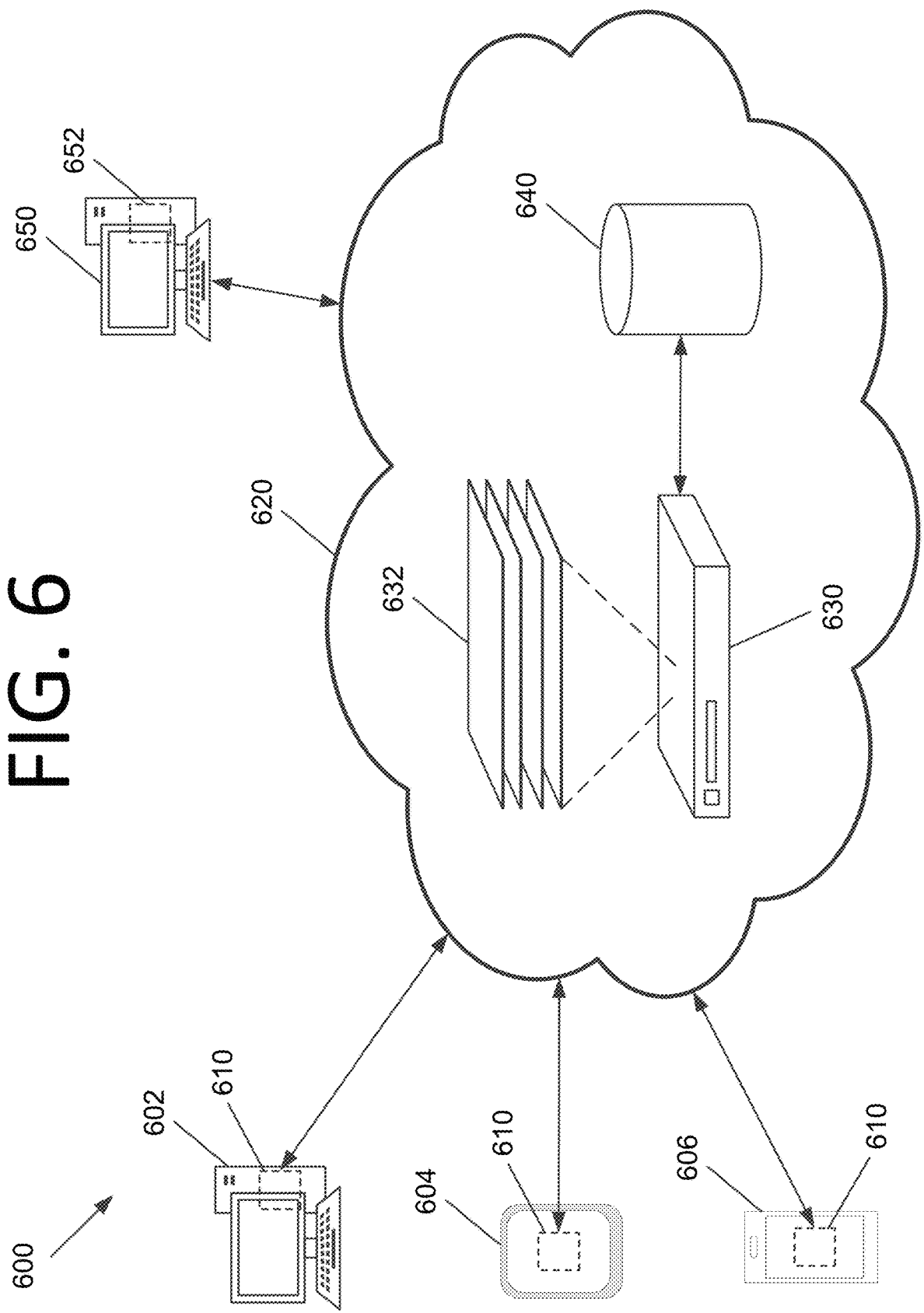
FIG. 6 is an architectural diagram illustrating a system configured to perform AI/ML model drift detection and correction for RPA, according to an embodiment of the present invention.

FIG. 6 is an architectural diagram illustrating a system 600 configured to perform AI/ML model drift detection and correction for RPA, according to an embodiment of the present invention. System 600 includes user computing systems, such as desktop computers 602, 603, tablet 604, and smart phone 606. However, any desired computing system may be used without deviating from the scope of invention including, but not limited to, smart watches, laptop computers, Internet-of-Things (IoT) devices, vehicle computing systems, etc. Also, while three user computing systems are shown in FIG. 6, any suitable number of computing systems may be used without deviating from the scope of the invention. For instance, in some embodiments, dozens, hundreds, thousands, or millions of computing systems may be used.

Each computing system 602, 604, 606 has an RPA robot 610 running thereon that calls and/or executes an ML model (e.g., one of AI/ML models 632 of server 630, a local ML model on computing system 602, 604, 606, and ML model located in any other location, etc.). RPA robots 610 may be robots generated via an RPA designer application in some embodiments. In this embodiment, RPA robots 610 send requests, and potentially input data, to AI/ML models 632. However, in some embodiments, AI/ML models 632 may obtain input data from one or more other sources (e.g., database 640, another computing system, etc.) in addition to or in lieu of input data from RPA robots 610.

RPA robots 610 send AI/ML model requests to and receive AI/ML model execution results from AI/ML models 632 of server 630 via a network 620 (e.g., a local area network (LAN), a mobile communications network, a satellite communications network, the Internet, any combination thereof, etc.). Server 630 collects and stores information pertaining to model drift for AI/ML models 632 in a database 640. This information may pertain to data drift, model drift, or both.

When a change condition is found (e.g., predictions or input data fall outside of a historical range) and/or a change threshold is met or exceeded (e.g., model statistical performance deviates from historical performance by at least a certain amount) for one of AI/ML models 632, in some embodiments, server 630 sends an alert or a retraining trigger to an application 652 running on a reviewer computing system 650 (e.g., as part of a queue for review and labeling). In some embodiments, application 652 may enable the reviewer to view information pertaining to the AI/ML model drift and correct the results (e.g., for model drift) and/or recognize that the input data has changed in nature (e.g., data drift). In some embodiments, application 652 may enable an ML operations person that "owns" the ML model in production to see model drift in a two-dimensional graph. For example, dimensionality reduction may be performed using PCA to show certain anomalies visually. Certain alerts may also be created to flag when one of these anomalies appears.

In some embodiments, there can be more layers of abstraction in application 652 where the data is presented to a business user in such a way that the business user can understand what the data means (e.g., a 2-D graph showing the business user how the analysis of the business data has changed). This may be presented in addition to or in lieu of the view for a more technically savvy ML operations person. For instance, a word cloud-like mechanism may be used to show outcomes that occur more frequently in a larger font and make it easier for a human to see which outcomes are most prevalent.

In certain embodiments, significant changes may be highlighted. For instance, a business user may be able to see that an AI/ML model for approving loans has jumped from 5 loans approved per day to 20 loans approved per day. The business user may then define rules to try to fix the model behavior on their end until retraining occurs if the problem is persistent. The business user may also be able to determine whether there was an anomaly that is not due to the AI/ML model's performance (e.g., the number of loan applications has increased, more qualified applicants are applying, etc.). Humans may also determine changes themselves that are causing deviations but were not detected by automated drift detection mechanisms using application 652. Two layers may exist in some embodiments—one for technically savvy users and another for business users.

In certain embodiments, multiple or many computing systems and review applications, including computing system 650 and application 652, may be used to collectively review and correct the results. In some embodiments, these results are pulled from a common queue. These corrections can then be provided back to server 630 and stored in database 640 for retraining drifting AI/ML model 632. However, in certain embodiments, server 630 may automatically detect that AI/ML model drift due to changes in the input data and/or changes in the AI/ML model predictions are occurring.

After AI/ML data and/or model drift is detected by server 630 (and after human corrections in some embodiments), drifting AI/ML model 632 is retrained. In some embodiments, retraining is performed by server 630. However, in certain embodiments, retraining may be performed by one or more other servers in addition to or in lieu of server 630. Drifting AI/ML model 632 can then be retrained using the collected information and/or other information to attempt to improve AI/ML model performance.

After the new version of AI/ML model 632 is properly trained (e.g., when retrained AI/ML model 632 meets certain thresholds), server 630 may save the new version of AI/ML model 632 in database 640, potentially replacing the previous version of AI/ML model. However, in certain embodiments, multiple versions of AI/ML model 632 may be stored. Server 630 then deploys retrained AI/ML model 632 to be called by RPA robots 610. However, in some embodiments, retrained AI/ML model 632 is deployed alongside one or more previous versions of AI/ML model 632. Drift of each version of AI/ML model 632 is then measured side-by-side to see whether the new version of AI/ML model 632 is performing better on real data. If this is determined to be the case over time, the new version of AI/ML model 632 may replace the previous version of AI/ML model 632. However, if not, the new version of AI/ML model may be discarded, or further retraining may be performed.

Figure 7A:
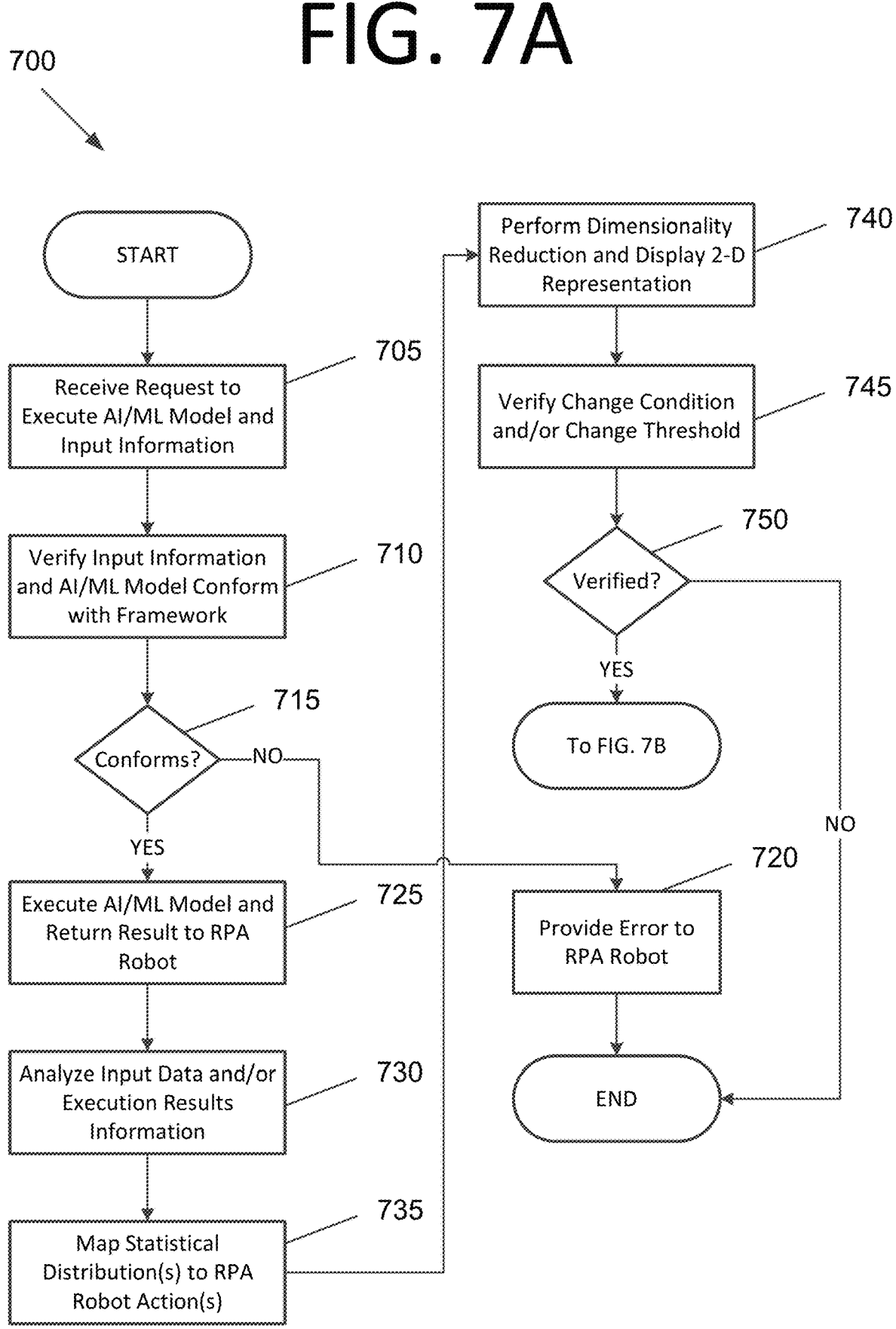
FIGS. 7A and 7B are flowcharts illustrating a process for performing AI/ML model drift detection and correction for RPA, according to an embodiment of the present invention.
Figure 7B:
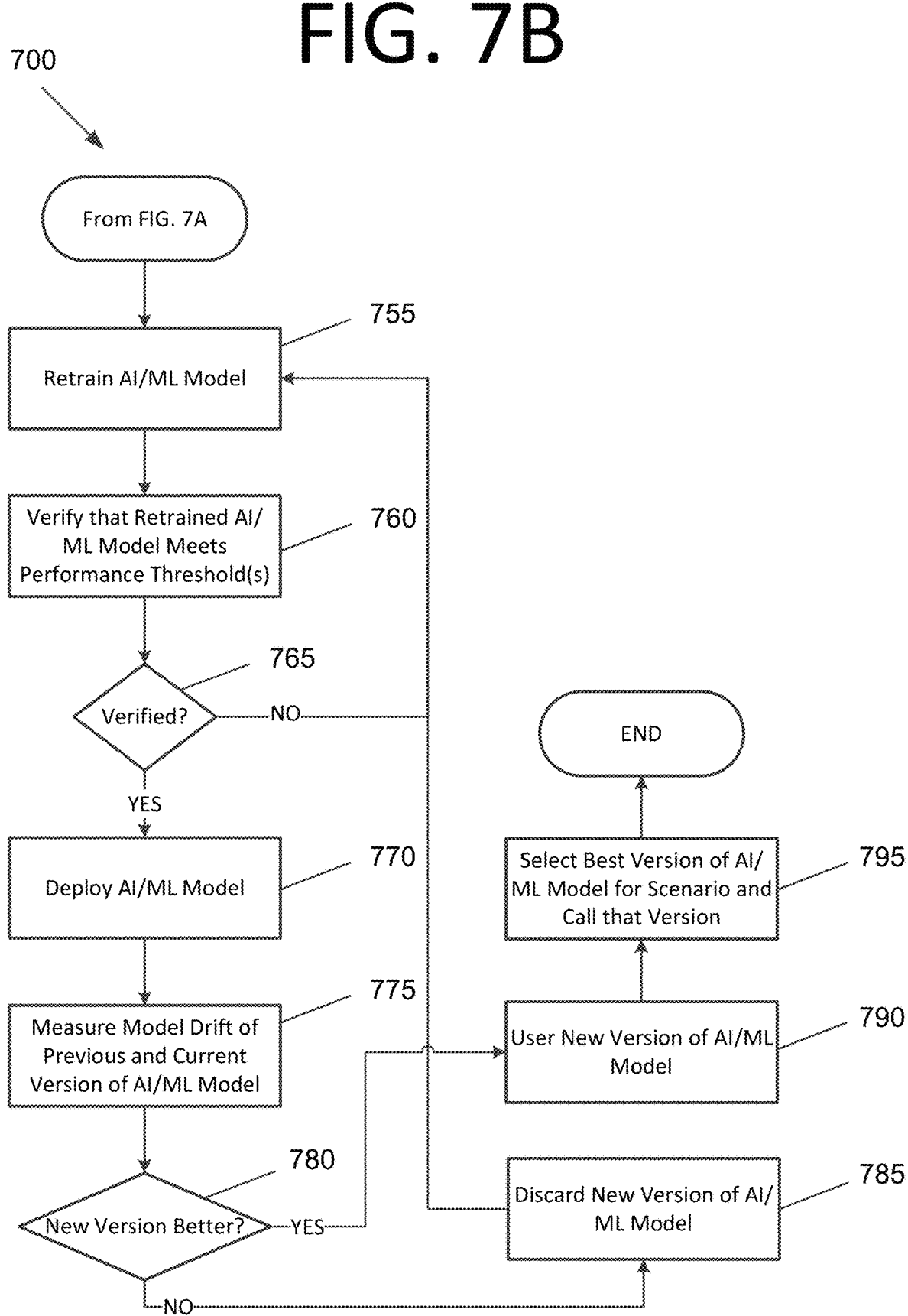

FIGS. 7A and 7B are flowcharts illustrating a process 700 for performing AI/ML model drift detection and correction for RPA, according to an embodiment of the present invention. The process begins with receiving a request to execute an AI/ML model and input information for the AI/ML model from an RPA robot at 705. Verification that the input information conforms with a framework for the AI/ML model is performed at 710. When the input information does not conform with the framework at 715, an error is provided to the RPA robot indicating that the input information does not conform with the framework at 720. When the input information conforms with the framework at 715, the AI/ML model is executed using the input information and a result of the execution of the AI/ML model is returned to the RPA robot at 725. In some embodiments, the framework is enforced for a plurality of AI/ML models.

Information pertaining to input data for an AI/ML model to determine whether data drift has occurred, information pertaining to results from execution of the AI/ML model to determine whether model drift has occurred, or both, is analyzed at 730. In some embodiments, the analysis includes measuring one or more distances between unidimensional distributions of an original dataset and a new dataset for covariate drift. In certain embodiments, the analysis includes determining whether a statistical moment changes. In some embodiments, the statistical moment includes a mean, a variance, a skewness, a kurtosis, a covariance, or a combination thereof. In certain embodiments, the information includes what predictions the AI/ML model made, how many predictions the AI/ML model made and how many predictions were used by RPA robots, one or more statistical distributions of the predictions made by the AI/ML model, input data that was provided to the AI/ML model, or a combination thereof. In some embodiments, the analysis of the information is performed across multiple RPA processes executed by multiple respective RPA robots (e.g., via federated learning).

In some embodiments, the information includes one or more statistical distributions of predictions made by the AI/ML model. In such embodiments, the one or more statistical distributions may be mapped to a respective action taken by a plurality of RPA robots at 735. In some embodiments, the action is taken in a respective activity of an RPA workflow of the respective RPA robot.

A dimensionality reduction technique is performed on the information to generate a two-dimensional representation of the information and the two-dimensional representation of the information is displayed at 740. Verification of whether a change condition is found a change threshold is met or exceeded, or both, is performed based on the analysis of the information at 745. In some embodiments, the verification includes verifying that the change condition, the change threshold, or both, have been met or exceeded for at least a predetermined period of time.

If the change condition is found, the change threshold is met or exceeded, or both, based on the analysis of the information at 750, the AI/ML model is retrained at 755. It is then verified that the retrained AI/ML model meets one or more performance thresholds at 760. If the one or more performance thresholds are not met at 765, the process returns to retraining the AI/ML model at 755. However, if the retrained AI/ML model meets the one or more performance thresholds at 765, the retrained AI/ML model is deployed at 770. In some embodiments, deploying the AI/ML model may include changing one or more activities of one or more RPA robots to call the new AI/ML model, replacing the previous version of the AI/ML model with the retrained AI/ML model. In certain embodiments, the AI/ML model is deployed using a canary testing technique or a champion/challenger testing technique.

The model drift of the retrained AI/ML model and the previous version of the AI/ML model are measured at 775 using real data. When the retrained AI/ML model does not perform better on the real data than the previous version of the AI/ML model based on the measured model drift at 780, the retrained AI/ML model is discarded at 785 and/or the process returns to step 755 for further retraining. However, when the retrained AI/ML model performs better on the real data than the previous version of the AI/ML model based on the measured model drift at 780, the retrained AI/ML model is used in addition to or in place of the previous version of the AI/ML model at 790. Based on input data and/or the use case, the retrained AI/ML model or a previous version of the AI/ML model is selected and called at 795. In some embodiments, the selection is made in a hierarchical manner.

In some embodiments, model drift detection may be performed per process or per group of processes. For instance, it may be better to use a certain version of an AI/ML model for a certain type of processing. It may be observed that as an AI/ML model is trained based on input data with a certain characteristic, the AI/ML model becomes less accurate for another type of input data. For example, consider the case where an AI/ML model used for processing invoices that has been trained using the European date format (e.g., 17 Nov. 2019 or 17/11/2019). If during training more invoices with the U.S. date format are used (e.g., Nov. 17, 2019, or 11/17/2019), the AI/ML model may begin to fail for invoices with the European date format.

Accordingly, in some embodiments, different versions of the AI/ML model may be trained to accommodate different situations, and drift detection may be used to select the AI/ML model version that works best for the given data. In certain embodiments, the AI/ML model versions may be applied in a hierarchical manner based on drift detection at the RPA workflow level. Logic may be developed to determine which AI/ML model version to use based on the type of input, or multiple AI/ML models may be tried in a hierarchical fashion and a result may be selected if certain criteria are met. This may also provide insight into how drift is occurring in multiple AI/ML model versions. This may help to determine whether the AI/ML model is bad for one use case, but not for others. In certain embodiments, an AI/ML model chain process may be built where deterministic logic governs the AI/ML model version that is used in a hierarchy. In some embodiments, another AI/ML model may determine which AI/ML model version to use. In certain embodiments, federated learning may be used, where multiple computing systems collaboratively learn a shared prediction model while keeping the training data on the local device. This may be particularly beneficial for ensuring compliance with RPA governance requirements (e.g., the E.U. General Data Protection Regulation (GDPR), the U.S. Health Insurance Portability and Accountability Act (HIPAA), third party terms of service, etc.).

The process steps performed in FIGS. 7A and 7B may be performed by a computer program, encoding instructions for the processor(s) to perform at least part of the process(es) described in FIGS. 7A and 7B, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 7A and 7B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program for performing artificial intelligence (AI)/machine learning (ML) model drift detection and correction for robotic process automation (RPA), the computer program configured to cause at least one processor to:
   analyze information pertaining to input data for an AI/ML model executed by one or more of RPA robots to determine whether data drift has occurred, analyze information pertaining to results from execution of the AI/ML model to determine whether model drift has occurred, or both, wherein the information comprises one or more statistical distributions of predictions made by the AI/ML model;
   map the one or more statistical distributions of the predictions made by the AI/ML model to respective actions taken by the one or more RPA robots in respective activities of RPA workflows; and
   responsive to, based on the analysis of the information, a change condition being found, a change threshold is met or exceeded, or both, retrain the AI/ML model.

2. The non-transitory computer-readable medium of claim 1, wherein the computer program is further configured to cause the at least one processor to:
   verify that the change condition, the change threshold, or both, have been met or exceeded for at least a predetermined period of time.

3. The non-transitory computer-readable medium of claim 1, wherein the analysis comprises measuring one or more distances between unidimensional distributions of an original dataset and a new dataset for covariate drift.

4. The non-transitory computer-readable medium of claim 1, wherein the analysis comprises determining whether a statistical moment changes.

5. The non-transitory computer-readable medium of claim 4, wherein the statistical moment comprises a mean, a variance, a skewness, a kurtosis, a covariance, or a combination thereof.

6. The non-transitory computer-readable medium of claim 1, wherein the information comprises what predictions the AI/ML model made, how many predictions the AI/ML model made and how many predictions were used by RPA robots, one or more statistical distributions of the predictions made by the AI/ML model, input data that was provided to the AI/ML model, or a combination thereof.

7. The non-transitory computer-readable medium of claim 1, the computer program further configured to cause the at least one processor to:
   verify that the retrained AI/ML model meets one or more performance thresholds; and
   responsive to the retrained AI/ML model meeting the one or more performance thresholds, deploy the retrained AI/ML model.

8. The non-transitory computer-readable medium of claim 7, wherein the retrained AI/ML model is deployed with a previous version of the AI/ML model and the computer program is further configured to cause the at least one processor to:

measure model drift of the retrained AI/ML model and the previous version of the AI/ML model using real data; and responsive to the retrained AI/ML model performing better on the real data than the previous version of the AI/ML model based on the measured model drift, use the retrained AI/ML model in place of the previous version of the AI/ML model.

9. The non-transitory computer-readable medium of claim 8, wherein responsive to the retrained AI/ML model not performing better on the real data than the previous version of the AI/ML model based on the measured model drift, the computer program is further configured to cause the at least one processor to:

discard the retrained AI/ML model or perform further retraining.

10. The non-transitory computer-readable medium of claim 7, wherein the retrained AI/ML model is deployed using a canary testing technique or a champion/challenger testing technique.

11. The non-transitory computer-readable medium of claim 1, wherein the computer program is further configured to cause the at least one processor to:

receive a request to execute the AI/ML model and input information for the AI/ML model from an RPA robot;
verify that the input information conforms with a framework for the AI/ML model; and
responsive to the input information conforming with the framework:
execute the AI/ML model using the input information, and
return a result of the execution of the AI/ML model to the RPA robot.

12. The non-transitory computer-readable medium of claim 11, wherein responsive to the input information not conforming with the framework, the computer program is further configured to cause the at least one processor to:

provide an error to the RPA robot indicating that the input information does not conform with the framework.

13. The non-transitory computer-readable medium of claim 11, wherein the framework is enforced for a plurality of AI/ML models.

14. The non-transitory computer-readable medium of claim 1, wherein the computer program is further configured to cause the at least one processor to:

perform a dimensionality reduction technique on the information to generate a two-dimensional representation of the information; and
display the two-dimensional representation of the information.

15. The non-transitory computer-readable medium of claim 1, wherein the analysis of the information is performed across multiple RPA processes executed by multiple respective RPA robots.

16. The non-transitory computer-readable medium of claim 1, wherein the computer program is further configured to cause the at least one processor to:

select the retrained AI/ML model or a previous version of the AI/ML model based on the input data; and
call the selected version of the AI/ML model.

17. The non-transitory computer-readable medium of claim 16, wherein the selection is made in a hierarchical manner.

18. A computer-implemented method for performing artificial intelligence (AI)/machine learning (ML) model drift detection and correction for robotic process automation (RPA), comprising:

analyzing information pertaining to input data for an AI/ML model executed by the one or more RPA robots to determine whether data drift has occurred, analyzing information pertaining to results from execution of the AI/ML model to determine whether model drift has occurred, or both, wherein the information comprises one or more statistical distributions of predictions made by the AI/ML model;

mapping the one or more statistical distributions of the predictions made by the AI/ML model to respective actions taken by the one or more RPA robots in respective activities of RPA workflows; and responsive to, based on the analysis of the information, a change condition being found, a change threshold is met or exceeded, or both:
retraining the AI/ML model,
verifying that the retrained AI/ML model meets one or more performance thresholds, and
responsive to the retrained AI/ML model meeting the one or more performance thresholds, deploying the retrained AI/ML model.

19. The computer-implemented method of claim 18, further comprising:

verifying that the change condition, the change threshold, or both, have been met or exceeded for at least a predetermined period of time.

20. The computer-implemented method of claim 18, wherein the retrained AI/ML model is deployed with a previous version of the AI/ML model and the method further comprises:

measuring model drift of the retrained AI/ML model and the previous version of the AI/ML model using real data; and responsive to the retrained AI/ML model performing better on the real data than the previous version of the AI/ML model based on the measured model drift, using the retrained AI/ML model in place of the previous version of the AI/ML model.

21. The computer-implemented method of claim 18, further comprising:

receiving a request to execute the AI/ML model and input information for the AI/ML model from an RPA robot;
verifying that the input information conforms with a framework for the AI/ML model; and
responsive to the input information conforming with the framework:
executing the AI/ML model using the input information, and
returning a result of the execution of the AI/ML model to the RPA robot, wherein the framework is enforced for a plurality of AI/ML models.

22. The computer-implemented method of claim 21, wherein responsive to the input information not conforming with the framework, the method further comprises:

providing an error to the RPA robot indicating that the input information does not conform with the framework.

23. The computer-implemented method of claim 18, further comprising:

performing a dimensionality reduction technique on the information to generate a two-dimensional representation of the information; and
displaying the two-dimensional representation of the information.

24. The computer-implemented method of claim 18, wherein the analysis of the information is performed across multiple RPA processes executed by multiple respective RPA robots.

25. The computer-implemented method of claim 18, further comprising:
   selecting the retrained AI/ML model or a previous version of the AI/ML model based on the input data; and
   calling the selected version of the AI/ML model.

26. A computer-implemented method for performing artificial intelligence (AI)/machine learning (ML) model drift detection and correction for robotic process automation (RPA), comprising:
   analyzing information comprising one or more statistical distributions of predictions made by an AI/ML model executed by one or more RPA robots, the information pertaining to input data for the AI/ML model to determine whether data drift has occurred, results from execution of the AI/ML model to determine whether model drift has occurred, or both, wherein the information comprises one or more statistical distributions of predictions made by the AI/ML model;
   mapping the one or more statistical distributions of the predictions made by the AI/ML model to respective actions taken by the one or more RPA robots in respective activities of RPA workflows; and
   responsive to, based on the analysis of the information, a change condition being found, a change threshold is met or exceeded, or both, for at least a period of time, retraining the AI/ML model.

27. The computer-implemented method of claim 26, wherein the information comprises how many predictions the AI/ML model made and how many predictions were used by the plurality of RPA robots.

28. The computer-implemented method of claim 26, further comprising:
   receiving a request to execute the AI/ML model and input information for the AI/ML model from an RPA robot of the plurality of RPA robots;
   verifying that the input information conforms with a framework for the AI/ML model; and
   responsive to the input information confirming with the framework:
      executing the AI/ML model using the input information, and
      returning a result of the execution of the AI/ML model to the RPA robot, wherein the framework is enforced for a plurality of AI/ML models.

* * * * *